Sept. 12, 1967 A. M. MARKS 3,341,274
ELECTRICALLY RESPONSIVE LIGHT CONTROLLING DEVICE EMPLOYING
SUSPENDED DIPOLE PARTICLES IN A PLASTIC FILM
Original Filed Feb. 4, 1964

INVENTOR.
ALVIN M. MARKS
BY
ATTORNEY

United States Patent Office 3,341,274
Patented Sept. 12, 1967

3,341,274
ELECTRICALLY RESPONSIVE LIGHT CONTROLLING DEVICE EMPLOYING SUSPENDED DIPOLE PARTICLES IN A PLASTIC FILM
Alvin M. Marks, 153—16 10th Ave., Whitestone, N.Y. 11357
Original application Feb. 4, 1964, Ser. No. 342,437, now Patent No. 3,257,903, dated June 28, 1966. Divided and this application Sept. 28, 1965, Ser. No. 490,943
3 Claims. (Cl. 350—267)

This invention relates to electrically responsive light controlling devices and specifically to structures which may reflect, transmit or absorb light upon the application of electrical potential thereto. This application is a division of an application filed Feb. 4, 1964 entitled Electrically Responsive Light Controlling Devices, in the name of Alvin M. Marks, Ser. No. 342,437, now U.S. Patent No. 3,257,903, which in turn is a division of application Ser. No. 70,777, filed Nov. 21, 1960 and now abandoned.

It is often desired to control the effect of light or other radiations upon a given surface. Thus, for example, if it is necessary to maintain a low temperature beneath a surface such as a roof, it may be important to reflect sunlight from the surface. At other times, the same surface may be used to absorb sunlight in order to heat the area beneath the roof. Such structures are valuable to implement summer and winter heating and cooling systems.

In the field of space satellites, it may be required that the surface of the satellites be absorbing when the satellite is in the shadow of the earth or the moon in order for it to absorb the long wave infra-red radiation. However, when the same satellite is subjected to the rays of the sun it may be necessary to reflect the said rays in order to avoid excessive temperatures within the satellite.

Under other circumstances, it may be desirable to provide a structure which can change from light reflecting to absorbing or transmitting states with great rapidity. Such operations are useful for signaling or display uses.

Accordingly, it is an object of the present invention to provide electrically responsive light controlling structures capable of being changed from a light reflecting to an absorbing medium.

Another object of the present invention is to provide a device which will reflect or transmit light incident thereon in response to an electrical voltage applied to the structure.

A further object of the present invention is to provide an electrically responsive light controlling structure which can change the color of the reflected light coming therefrom in response to an electrical impulse.

An object of the present invention is to provide a surface which will increase or decrease the transmission of radiant heat impinging thereon.

A feature of the present invention is its use of minute flakes or elongated flat particles hereinafter referred to as dipoles carried in suspension which are capable of reflecting or permitting the passage of light therethrough, as the result of their alignment by an electrical field or their disorientation in the absence of an electrical field.

Another feature of the present invention is its use of transparent conductive coatings which permit the dipoles to be oriented rapidly.

A further feature of the present invention is its use of a protective barrier for the conductive coatings to prevent the dipole particles or the suspending liquid from reacting with the said coatings.

Still another feature of the present invention is its use of thin transparent conducting layers on transparent supports which are spaced apart only a short distance whereby substantially complete alignment may be achieved using electrical potential differences in the 10 to 500 volt range, the speed of alignment increasing with the applied voltage.

A feature of the present invention is its use of a grid or network of thin conductive lines to control the dipoles.

Another feature of the present invention is its use of external sensing devices to change the light controlling structure from reflecting to absorbing and vice versa as required.

The invention consists of the construction, combination, arrangement of parts herein illustrated, described and claimed.

In the accompanying drawings, forming part hereof, is illustrated several forms of the invention, in which drawings similar reference characters designate corresponding parts and in which.

Figure 1:
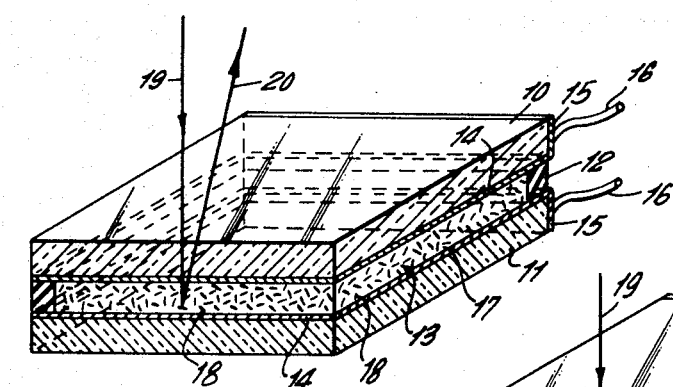
FIGURE 1 is a fragmentary view on an enlarged scale of an electrically responsive light controlling structure made in accordance with the present invention showing the dipole particles in a disoriented, reflecting state.

Referring to the drawing and particularly to FIGURE 1, 10 indicates a transparent sheet of glass, plastic or the like. A second sheet of material 11, made of glass, plastic or other fluid impervious material is spaced from the first sheet 10. A fluid tight gasket 12 is disposed between the sheets 10 and 11, adjacent the edges thereof to form a small flat tank-like area 13 between the said sheets 10 and 11. The surfaces of the sheets 10 and 11 which define the tank-like area 13 are covered with an electrically conductive transparent coating 14 hereinafter more fully described. The conductive coatings 14 are connected to suitable metallic strips or bus bars 15 which are disposed along the edges of the sheets 10 and 11. Electrical leads 16 are in turn connected to the bus bars 15 and lead to a suitable source of electrical potential (not shown).

The tank-like space 13 between the sheets 10 and 11 is filled with a fluid 17 in which there is carried a suspension of particles hereinafter referred to as dipole particles 18.

When the dipole particles 18 are free to move about within the tank-like space 13 they respond to Brownian movement in become randomized as best shown in FIGURE 1. Since the dipole particles within the tank-like area 13 are highly reflective, needle-like or flat elongated needle-like, or flat flake-like, particles, light, indicated by the arrows 19, will be reflected and emerge from the structure as beam 20. The specific nature of the reflective dipole particles 18 will be hereinafter more fully set forth.

Figure 2:
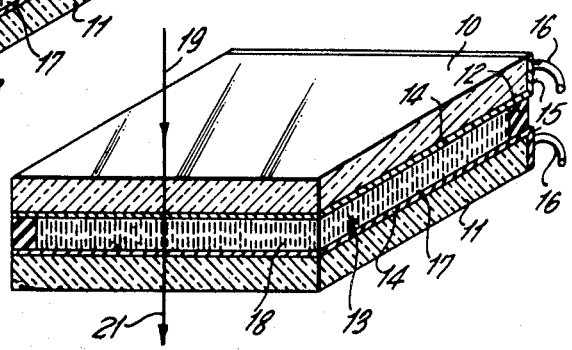
FIGURE 2 is a view similar to FIGURE 1, showing the aligned dipole particles.

When an electric field is imposed across the conductive coatings 14 by the application of electrical potential to the leads 16, the dipole particles 18 will become aligned with their long direction parallel to the electric field and normal to the surface of the sheets 10, 11, as shown in FIGURE 2. Since the thickness of the dipole particles 18 is small compared to their length, the light 19 will be able to pass between them and reach the second sheet 11. If the second sheet 11 is transparent the light 19 will traverse the assembly as indicated by the emergent ray 21. If the second sheet 11 is light absorbing, it will absorb the light beam 19 within the structure of the device. It is within the purview of the present invention to make the second sheet 11 of a colored material whereby the light beam 19 will be reflected from the colored surface of the second sheet 11 and emerge as a colored beam having a hue different from the incident beam.

When the electric field is decreased or reduced to zero, the dipole particles 18 again become randomized by Brownian motion presenting many layers with their long dimension at an angle to the light rays 19. Because the dipole particles have a higher index of refraction than the suspending liquid 17 many reflections occur which reflect the incident light back in a more or less diffused pattern.

The effect of Brownian motion can be ascribed to an average relaxing force acting on the suspended particles due to thermal-energy. When the electrical forces align the dipoles, the speed of alignment is expected to obey similar laws, but since the electrical forces applied are much greater than those due to thermal energy, much more rapid alignment can be expected with the applied electric force.

It will be apparent that the optical characteristics of the assembly may be varied from highly reflective to highly absorbent and also may be employed to change from highly reflective to light transmitting.

Figure 3:
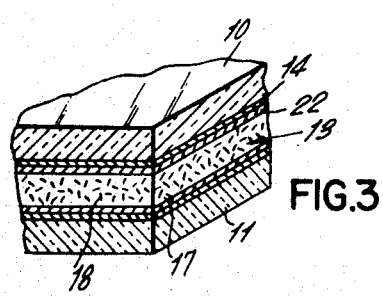
FIGURE 3 is a fragmentary view similar to FIGURES 1 and 2, showing a protective coating between the conductive coating and the dipole suspension.

Referring to FIGURE 3 it will be seen that the conductive coatings 14 are covered by a transparent protective layer 22 which is disposed upon the coatings 14 on their dipole suspension sides. The protective coating 22 is necessary where certain dipole suspensions may be chemically reactive with the conductive coatings. The protective layer 22 may, for example, consist of transparent silicon monoxide layers.

While the flat tank-like area 13 has been shown with substantial thickness in the figures it is to be understood that the drawing is merely for the purpose of clarity and in actual practice the sheets 10 and 11 may be spaced apart, for example, a distance of from .05 to 0.50 millimeter. As a result of the small spacing between the sheets it is possible to get a substantially complete alignment of the dipole particles within the tank-like area 13 with voltages of the order of 10 to 500 volts.

Figure 4:
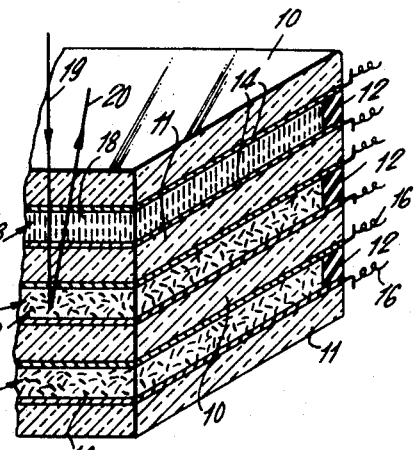
FIGURE 4 is a fregmentary view on an enlarged scale of an electrically responsive light controlling structure having a plurality of layers of dipole suspensions, a further embodiment of the present invention.

FIGURE 4 illustrates still another embodiment of the present invention in which several cells are arranged to provide a series of flat tank-like areas 13 having dipole suspensions 18. In this embodiment the dipoles may be differently colored in each of the tank-like areas so that light traversing the first tank-like area 13 may be reflected by the dipoles in the second and light traversing the first and second tank-like areas 13 may be reflected from the dipoles in the third.

The amount and extent of light penetrating the various cells in the embodiment shown in FIGURE 4 can be controlled by controlling the voltage across the individual cells. Thus, if an electrical potential is applied only to the first layer of dipole suspension 18, the light will traverse the said first layer and be reflected from the second. If an electrical potential is applied to the first and second layer the light will traverse both layers and be reflected from the third layer. In this manner, three individual colored reflections may be achieved by the structure illustrated.

Figure 5:
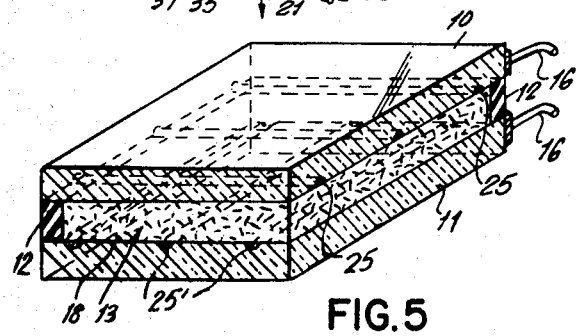
FIGURE 5 is a fragmentary view on an enlarged scale of an electrically responsive light controlling structure having a plurality of conductive lines on each side of the dipole suspension for controlling dipole movement, another embodiment of the present invention.

In lieu of conductive coatings 14 shown in FIGURES 1-4, there may be employed a network or spaced grid of parallel conducting lines 25, 25' on each sheet and disposed at right angles to each other as shown in FIGURE 5. The conducting lines 25 are shown greatly enlarged for the sake of clarity. It is to be understood that the width of the lines 25 must be comparatively negligible compared to the distance between them so that light passing through the sheets 10 and 11 is not appreciably scattered or impeded by the lines 25.

The lines 25 may comprise thin rulings on the sheet surfaces into which there is worked or deposited a metallic material such as silver. The diameter of said lines must be of such order that the resistance to the flow of electrical energy is comparatively low to avoid the effect of attenuation. The result of this construction will be that a potential may also be applied to a single pair of lines 25-25' of the network at the edge of a sheet 10, 11, so that it is substantially instantaneously transmitted to only the small area where they cross and thus only this small area is aligned. Such a structure is useful to display information such as a letter or design.

In other respects the structure shown in FIGURE 5 is identical to that shown in FIGURES 1-4, in that it contains a tank-like area 13 within which is carried a suspension of dipole particles 18.

It is within the purview of the present invention to connect the conductive lines 25-25' to separate leads in groups so that small areas within the tank-like cell 13 can be oriented while allowing the remainder of the cell to be reflective. In this manner, novel displays of light can be achieved.

DIPOLES

The flat tank-like areas 13 are filled with a suitable liquid or fluid 17 in which is contained a suspension of elongated dipole particles 18. In addition to being reflective the dipole particles must also be capable of being oriented by an electrical field. Where there is to be little or no scatter of light, the length of the dipole particles is preferably of the order of 2,000 to 3,500 Angstroms or any even integral multiple thereof and their cross-sectional width of the order of 200 to 700 Angstroms. These dimensions are necessary in order that the dipole particles effectively reflect or scatter visible light incident upon them at an angle of approximately plus or minus 40° to the normal of their longitudinal axis and add substantially no reflectivity or scatter at other angles. The extremely small width of the dipole particles 18 (of the order of 1/10 the wave length of blue light) enables a light beam 19 projected approximately normal to the plane of the sheets 10 and 11, to traverse the dipole suspension without substantial scattering or reflection from the dipole particles 18.

Examples of particles having a suitable length to avoid light scatter when oriented within the required range for use as dipole particles are certain proteins such as the well known tobacco mosaic virus, which has a length of between 2,800–3,300 Angstrom units, and a diameter of about 150 Angstrom units. Other suitable materials are, for example, sodium thymonucleate, myosin, guanidinium halides, etc. The size of the particle may be controlled by controlling the aggregation or crystallization of these substances.

Larger particles, up to about 50 microns in diameter by about 1 micron thick may be employed where light scatter is not objectionable; as with variable reflectivity panels where image transmission is not a problem.

Colloidal suspensions of anisotropic, birefringent elongated dipole particles of substances which have an inherently large dipole moment, may also be used. These colloidal particles may preferably be suspensions of crystallites in a suitable liquid. The crystallites may be obtained from a widely dispersed class of organic or inorganic chemical compounds; for example, meconic acid, quinine sulphate, certain protein crystallites previously set forth, quartz, etc.

Mixtures of particles having a substantially constant reflectivity through the visible spectrum are recommended as dipole particles. Such mixtures may comprise, for example, particles such as vanadium pentoxide, tungstic acid, or herapathite sols preferably in liquid suspensions.

Herapathite crystals suitable for use as absorptive dipole particles may be prepared in accordance with the following:

Preparation of herapathite crystals

Solution 1:                                                              Grams
    Iodine _____ 1
    Normal propanol _____ 4

Dissolved by continuous heating and shaking. This contains $7.89 \times 10^{-4}$ moles of $I_2$ per gram.

Solution 2:                                                              Grams
    Quinone bisulfate _____ 15
    Methanol _____ 31

Solution 3:                                                              Grams
    Nitrocellulose solutions _____ 5
    Methanol _____ 5

Solution 4:                                                              Grams
    Solution 3 _____ 5
    Solution 2 _____ 1

This solution becomes milk white and will clear temporarily if heated. The addition of solvents will clear the solution permanently. The cleared solution is solution 5.

Solution 5:                                                              Gram
    Solution 4 _____ 1
    Methanol _____ 0.177
    Butyl acetate _____ 0.193

Solution 5 is then warmed and pressure filtered to remove any centers of crystallization. This mixture now contains $7.25 \times 10^{-5}$ moles of quinine bisulfate per gram. The solution may gel on standing, but may be broken by warming and shaking.

*Solution 6.*—To five grams of cooled solution 5 (quinine bisulfate in nitrocellulose) add 0.75 gram of cooled solution 1 (iodine). The solution is now blue-black due to the formation of a suspension of crystals of quinine trisulfate dihydroiodide tetraiodide hexahydrate

$$(4C_{20}H_{24}O_2N_2 \cdot 3H_2SO_4 \cdot 2HI \cdot I_4 \cdot 6H_2O)$$

This substance is called herapathite.

Another form of dipole particle suitable for the present invention may comprise anisotropic crystal needles coated with metallic films of silver, platinum or the like.

In lieu of crystal needles there may also be employed flake-like particles such as glass flakes or natural and synthetic pearlescence, for example, bismuth or lead carbonate crystals. These crystals are hexagonal platelets about 20 microns in diameter by about 0.5 micron thick, and of an index of refraction of about 2.09.

Amorphous glass flakes having an index of refraction of 2.0 or more and preferably in the range of 2.2 to 2.6 and a length of .5 to 20 microns and a thickness of .05 to 2 microns are suitable for use as flake dipole particles. Glass flakes of this nature have been aligned for the purpose of permitting light to pass therethrough and are also highly reflective when disoriented. Ordinary commercially available glass flakes having an index of about 1.52, may be coated with titanium dioxide films on one or both surfaces in known manner and will then have an index of refraction of about 2.7. A lower concentration of these will provide high reflectivity.

Increasing the Brownian motion of the dipole particles 18 will facilitate the speed of disorientation. In addition to mechanical disorientation hereinabove described, radiating the entire tank-like area 13, with infra-red radiation and providing a suspending liquid capable of absorbing said radiation will greatly facilitate the disorientation of the dipole particles 18 when the electrical field is removed.

LIQUIDS

Suitable liquids for the dipole suspensions may comprise certain well known plasticizers such as the silicone fluids, dibutyl phthalate, diphenyl and others. In some instances water or certain of the higher alcohols may be used as the suspending fluid.

The viscosity of the liquid is a factor in the speed of response. The viscosity depends on the suspending fluid used, the concentration of the colloidal medium and the dipole particles or crystals. When low viscosity fluids are used the viscosity of the dipole suspension will decrease, particularly at greater dilutions.

In many solutions the specific resistance of the solution is too low due to the presence of ionizable liquids such as water or methanol or dissolved electrolytes. Power is therefore dissipated between the electrodes and a bubbling action interferes with the alignment of the dipole particles or crystals. This problem may be overcome by adding high boiling solvents having a boiling point in excess of 150° C. and a freezing point below 10° C. Evaporating techniques are then utilized to extract the low boiling solvents and thereby increase the resistivity of the solution. For example, by the addition of equal parts of dibutyl phthalate as the plasticizer in the above Solution 6 and boiling off the methanol by applying vacuum at room temperature, it was found that the specific resistance was 47 times lower than prior to the evaporation of the lighter solvents.

In carrying out this technique using the herapathite crystals referred to above, 5.75 grams of the desired high boiling liquid is added to 5.75 of the herapathite Solution 6 in the nitrocellulose solution. All the volatile solvents are then evaporated by the application of a vacuum at 5–7 mm. until the resistance is at a maximum. Resistance may be measured with two 7 mm. aluminum electrodes placed 4 mm. apart and immersed to a depth of one centimeter. Typical values of initial and final resistance are 400,000 ohms and 125 megohms, respectively.

High boiling liquids found to be useful with Solution 6 are dibutyl phthalate, di oso octyl adipate and dibutyl sebacate.

TRANSPARENT CONDUCTIVE COATINGS

Transparent conductive coatings as hereinabove described suitable for use on the surfaces of the sheets 10 and 11, may comprise stannic oxide films such as are sold by the Liberty Mirror Company under the designation EL–SX.

It is within the purview of the present invention to cover the grid or network of conductive lines 25 with a conductive coating such as is herein disclosed. Such coating will facilitate the uniform distribution of the charge over the surface of the sheets 10 and 11. The conductive coatings may also be overlain by a thin transparent layer such as a glass sheet for protective purposes.

REFLECTING FILMS ON DIPOLES

The elongated dipole particles 18 may be formed from an anisotropic crystal needle upon which is deposited a metal reflecting film of silver, platinum or some other light reflecting material. This can be accomplished by adding to the suspended crystals a suitable deposition liquid similar to that which is used for the deposition of silver on glass. The deposition liquid may also contain coloring matter to give the reflecting surfaces a color tone as desired.

Alternatively a high index coating such as titanium dioxide may be applied as previously set forth herein.

Figure 6:
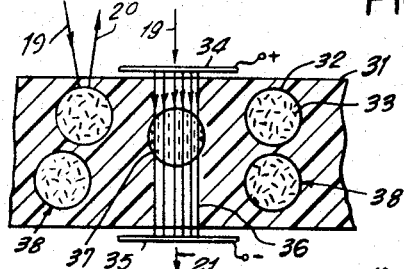
FIGURE 6 is a somewhat diagrammatic cross-sectional view, greatly enlarged, of a further form of a light controlling film according to the present invention.

FIGURE 6 shows a further embodiment of an electrically responsive light controlling device in the form of a transparent film 31 having a plurality of small drops 32 therein within which there are contained high index flakes 33, such as lead carbonate crystals. Lead carbonate crystals are thin hexagonal platelets having an index of refraction of 2.09. The drops 32 may comprise silicone oil in which the lead carbonate crystal platelets are suspended. The drops are then mixed with a film forming solution which may be any suitable plastic, such as cellulose acetate, polyvinyl acetaldehyde, or the like, and then cast to form a continuous strip 31.

Electrodes 34, 35 which may be transparent electrodes may be used to supply a field indicated by the lines 36 across the film 31. The field 36 causes particles 33 in the drops 32 to be aligned parallel to the field as indicated at 37. In the drops 32 where there is no electrical field the particles 32 will remain disoriented as indicated at 38. The film 31 shown in FIGURE 6 will appear transparent where the particles 33 are oriented and light reflecting where the particles are disoriented as indicated by the arrows 19 and 20. This film can be used to form a flexible sheet having an image which can be electrically produced or erased. The electrodes 34, 35 may be of large area, or may be strip electrodes for aligning particular areas of the surface to produce controlled displays.

An electrically charged surface as utilized in the well known Xerox processes, may be used to locally align or disalign the particles, and thus produce an image.

The film 31 will retain its local transmittance or reflectance characteristics, if the particles are suspended in a viscous solution.

Such a film could be switched on and off by vertical or horizontal electric fields.

On the other hand, if low viscosity fluid and small diameter particles are employed within the drops 32, the image will be maintained momentarily, and will start to fade as the particles are disoriented by operation of Brownian motion. Such a film can be utilized over and over again.

From the foregoing it will be apparent that there have been provided electrically responsive light controlling devices capable of transmitting or reflecting either partially or wholly light incident thereon. In addition these devices change the color of light reflected therefrom to one or more colors as desired. The devices are rapid in action and will not break down over continued use.

Having thus fully described the invention what is claimed as new and desired to be secured by Letters Patent of the United States, is:

1. An electrically responsive light controlling device comprising a continuous transparent plastic film having two parallel faces, a plurality of small drop-like elements within the film, said drops comprising a liquid and a plurality of thin high index flakes suspended therein, a transparent electrode on each face of the film and means to apply an electrical potential to the electrodes to align the flakes within the drops normal to said faces.

2. A device according to claim 1 in which the flakes are lead carbonate crystals and the liquid is silicone oil.

3. A device according to claim 1 in which the electrodes comprise a series of strips across the top and bottom of the film.

No references cited.

JEWELL H. PEDERSEN, *Primary Examiner.*

E. S. BAUER, *Assistant Examiner.*